United States Patent [19]

Lutz

[11] 4,109,821

[45] Aug. 29, 1978

[54] ARTICLE INCLUDING AN INTEGRALLY MOLDED BALL AND SOCKET TYPE HINGE

[76] Inventor: Michael Lutz, 226 High Tor Dr., Watchung, N.J. 07060

[21] Appl. No.: 824,627

[22] Filed: Aug. 15, 1977

Related U.S. Application Data

[62] Division of Ser. No. 647,088, Jan. 7, 1976, Pat. No. 4,049,231.

[51] Int. Cl.² .................... B65D 43/14; B65D 51/04
[52] U.S. Cl. .................................. 220/337; 220/338; 16/DIG. 13; 16/128 B
[58] Field of Search ............ 220/337, 338; 16/128 R, 16/128 B, DIG. 13, 171

[56] References Cited

U.S. PATENT DOCUMENTS

| 3,077,282 | 2/1963 | Eggers | 16/DIG. 13 |
| 3,994,416 | 11/1976 | Mulligan | 220/338 |

*Primary Examiner*—George T. Hall
*Attorney, Agent, or Firm*—Martin L. Faigus

[57] ABSTRACT

An article having two sections which are articulated to one another by at least one hinge that includes a substantially spherical male hinge member disposed within a recess provided by a surface of a female hinge member. The hinge includes retaining means for confining the male hinge member within the recess while permitting rotational motion of the male hinge member within the recess. The male member is a continuous molded extension of one section of the article and the female hinge member is a continuous molded extension of the other section of the article.

18 Claims, 16 Drawing Figures

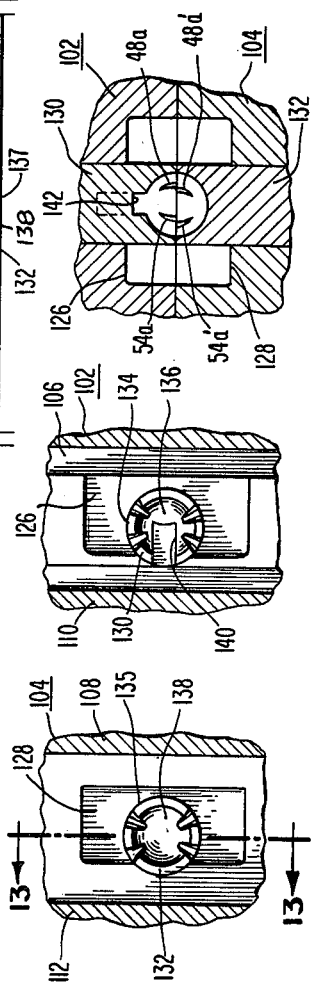
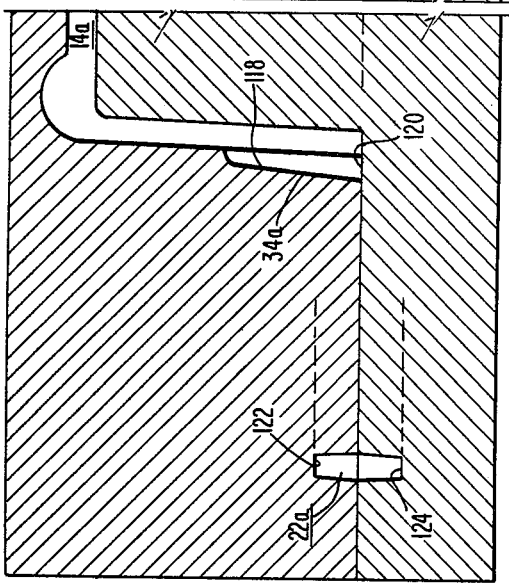
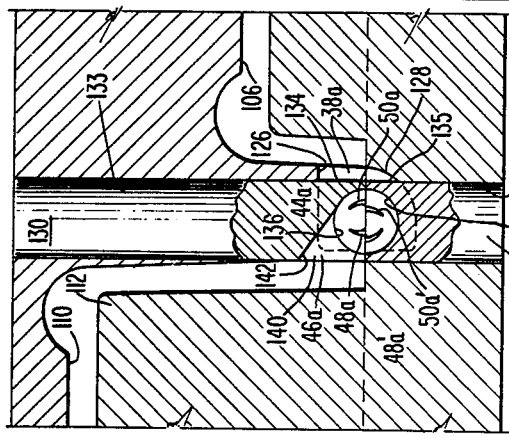
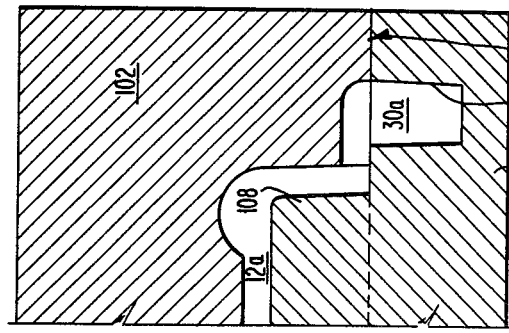

ARTICLE INCLUDING AN INTEGRALLY MOLDED BALL AND SOCKET TYPE HINGE

This is a division, of application Ser. No. 647,088, filed Jan. 7, 1976, now U.S. Pat. No. 4,049,231.

A mold for use in manufacturing the above-described article includes upper and lower mold sections which, when brought into mating relationship with each other, provide article section forming compartments adjacent to each other for forming the sections of the article. A female hinge member forming compartment communicates with one of the section forming compartments. A mold segment interrupts the female hinge member forming compartment. This mold segment includes walls having an outer periphery about which the recess in the female hinge member is formed, and an inner, substantially spherical pheriphery providing a male hinge member forming compartment. Slots extend through walls of the mold segment which interrupt the female hinge member forming compartment for communicating the female hinge member forming compartment with the substantially spherical male hinge member forming compartment. The retaining means for confining the male hinge member within the recess of the female hinge member are formed within these slots. An additional slot in the mold segment provides communication between the substantially spherical male hinge member forming compartment and the other article section forming compartment. From the above description it can be seen that a continuous passage for the flow of molding material is provided between the two article section forming compartments so that each part of the hinge is integrally formed with its respective article section, and with the substantially spherical male hinge member confined within the recess of the female hinge member.

BACKGROUND OF THE INVENTION

1. Field of the Invention

This invention relates to an article having two sections which are articulated together through a hinge, and to a mold for use in manufacturing the article. More specifically, this invention relates to a rigid article having two sections which are articulated together through a ball and socket-type hinge which is simultaneously molded with the sections of the article in an assembled and operative condition, and to a mold for use in manufacturing the article.

2. Description of the Prior Art

Rigid plastic containers including a two-piece hinge connecting a lid to a container body have many commercial applications. The specific application is in the bulk packaging of relatively small articles, such as nails, bolts, screws, nuts and the like. These containers have been displayed or stored in bins, or alternatively, have been provided with annular openings to permit them to be displayed or stored on supporting rods connected to a peg board or a similar supporting structure.

Until the advent of the invention disclosed in U.S. Pat. No. 3,456,913, issued on July 22, 1969 to the inventor of the subject matter of this invention, it was common practice to mold one portion of a two-piece hinge with the body of the container and the other portion of the hinge with the lid of the container. However, the two pieces of the hinge were not molded in an engaged and operative condition. Accordingly, a separate and independent step of mating the lid and container body through their hinge pieces was required. This approach adds expense and time to forming the containers, as compared to a process in which the containers are initially molded with the hinge pieces in an assembled and operative condition. Moreover, when the containers are formed of substantially ridgid plastic material, or have delicate hinge parts of very thin dimensions, the assembly operation is difficult, and can cause damage to the hinge.

U.S. Pat. No. 3,456,913, disclose a mold for use in integrally molding hinged plastic containers with the hinge pieces engaged in their operative condition. Specifically, the container disclosed in the U.S. Pat. No. 3,456,913 includes a pintle 18 of a male hinge member extending through an eye 17 of a female hinge member. The pintle 18 is generally of very thin proportions, and therefore may break if an undesirable torque is imposed upon it. Moreover, the outside diameter of the pintle is less than the inside diameter of the eye, and this structural relationship inherently follows from the mold configuration employed to form the hinge. Accordingly, the hinge includes some play in it. For some applications this loose fitting relationship between male and female hinge members may not be desired.

The mold disclosed in the U.S. Pat. No. 3,456,913 is somewhat complex, and includes thin wall sections which may become damaged by fragments of molded material which are inadvertently left in the mold after an injection molding operation. These fragments may cause the thin wall sections to break when the mold sections are closed for a subsequent molding operation.

The complexity of the mold disclosed in the U.S. Pat. No. 3,456,913 results from the fact that it includes core pins 34 which must be moved laterally into sliding engagement with a seat 38 provided by surfaces of upper and lower mold sections which are moved vertically with respect to each other. Accordingly, the mold requires a cam mechanism for affecting the lateral movement of the core pins as the upper and lower mold sections are moved vertically into a closed, injection molding condition. Moreover, the mold requires some retracting mechanism for withdrawing the core pins from the mold after the injection molding operation has been completed. The inclusion of the above-described camming and retracting mechanism in a mold enhances its complexity.

The core pins 34 employed in the mold disclosed in the U.S. Pat. No. 3,456,913 include a hollow head portion 36 which, in the closed condition of the mold, tightly engages surfaces of the upper and lower mold sections which define seat 38. When the mold is in its closed condition the hollow portion of each head 36 communicates with a male hinge member forming cavity 27. The peripheral wall defining the hollow head portion 36 is quite thin. Therefore, any plastic fragments which are inadvertently left on the surfaces defining seat 38, or within the male hinge member forming cavity 27, may cause the head portion 36 to break, or otherwise become damaged, as the mold is closed to perform a subsequent injection operation. Furthermore, sliding frictional engagement between the core pins 34 and the mold seats for the pins can cause undesirable wear of the frictionally engaged surfaces.

U.S. Pat. Nos. 2,687,157 (Cowan); 2,778,533 (Savary); 2,875,472 (Marcus) and 3,013,308 (Armour) disclose single-piece, web-type hinges which are integrally injection molded with sections of an article that are to be articulated with respect to each other. The hinge arrangement disclosed in these patents, as well as the mold employed to form them, are somewhat nonanalogous to the instant invention which relates to the molding of two-piece hinges with the hinge pieces in an operative and engaged condition with respect to each other.

SUMMARY OF THE INVENTION

This invention relates to an article having two sections articulated to one another by at least one hinge. The hinge is of the ball and socket type, and includes a substantially spherical male hinge member disposed within a recess provided by a surface of a female hinge member. The female hinge member includes retaining means for confining the male hinge member within the recess while permitting rotational motion of the male hinge member within said recess. The male hinge member is a molded extension of one section of the article, and the female hinge member is a continuous molded extension of another section of the article. To the best of applicant's knowledge no one in the prior art has suggested a rigid molded article having two sections connected together by a ball and socket-type of hinge in which a female hinge member is an injection molded extension of one section, a substantially spherical male hinge member is an injection molded extension of the other section, and the male and female hinge members are in operative engagement with each other.

In a preferred embodiment of this invention the two sections of the article are articulated to one another by at least two of the above-described ball and socket-type hinges. These hinges are laterally spaced with respect to each other to provide a linear axis of rotation between the two sections.

Preferably, the retaining means for confining the substantially spherical male hinge member within the recess of the female hinge member includes ribs forming injection molded junctions with the outer periphery of the male hinge member and the surface providing the recess of the female hinge member in the "as molded" condition of the article. By applying a rotative force to the sections of the article the ribs are caused to fracture adjacent their junction with the spherical male hinge member. The fractured junctions of the ribs constitute an inner race which closely circumscribes the substantially spherical male hinge member to confine it to rotative motion within the recess of the female hinge member. This close conformity of the fractured junctions of the ribs with the substantially spherical male hinge member provides a hinge construction with very little play in it. Accordingly, the rotational motion of the article sections is confined to a precise rotational path, which is often desirable.

A ball and socket-type hinge, unlike the pintle and eye hinge disclosed in U.S. Pat. No. 3,456,913 (referred to earlier in this application), is not readily susceptible to breaking by the application of an undesirable torque to the hinge. Stating this another way, a pintle of narrow proportions extending transversely from a support can become fractured, or otherswise demaged by the application of an undesirable torque to the pintle through the surfaces defining the eye. Since a substantially spherical male hinge member does not include any element which is equivalent to a transversely extending pintle, the liklihood of damaging the spherical male hinge member is less than the liklihood of damaging the pintle disclosed in the U.S. Pat. No. 3,456,913.

In the preferred embodiment of this invention the article is in the form of a container having a container bottom articulated to a container top through a pair of transversely spaced ball and socket-type hinges of the type described above. Preferably these hinges rotatively connect the rear walls of the container bottom and container top. A forward wall of either the container top or container bottom is connected to a handle through a pair of laterally spaced ball and socket-type hinges of the same type as described above. Accordingly, the handle is rotatable about a linear axis passing through the center of its substantially spherical male hinge members, and is an injection molded extension of said male hinge members. The handle can be rotated outwardly to a position in which it can be hung on a supporting rod or stem attached to a peg board or a similar supporting structure Alternatively, the handle can be rotated to a position in which it is substantially flush with a surface of the section to which it is rotatively connected to minimize the overall dimensions of the container. This latter condition is preferred when it is desired to store or display the containers in a bin.

This invention also relates to a mold for use in integrally molding two sections together through a two-piece, ball and socket-type hinge with the two pieces of the hinge in their engaged and operative condition. This eliminates the step of assembling the pieces of the hinge after the sections have been molded. The mold includes upper and lower mold sections which are movable in a linear direction toward and away from each other. When the mold sections are in a closed condition the mold includes article section forming compartments for molding the sections of the article adjacent to one another. A female hinge member forming compartment communicates with one of the article section forming compartments and is interrupted by walls of a mold segment. The outer periphery of the walls includes a surface about which the recess in the female hinge member is formed. Inner surfaces of the mold segment provide a substantially spherical compartment in which a substantially spherical male hinge member is formed. Slots extend through walls of the mold segment to communicate the female hinge member forming compartment with the substantially spherical male hinge member forming compartment. Plastic material flowing into these slots form the retaining ribs for confining the spherical male hinge member within the recess of the female hinge member. An additional slot communicates the substantially spherical male hinge member forming compartment with the other article section forming compartment, and plastic material flowing into this latter slot forms an injection molded support connecting the spherical male hinge member to said other section of the article.

The mold of this invention is of an extremely simple construction; requiring only upper and lower mold sections which are movable in a linear direction toward and away from each other. In other words, the mold of this invention does not require the use of core pins which must be moved laterally with respect to the direction of movement of upper and lower mold sections. Therefore, complex camming and retracting mechanisms are not required, as is the case with the mold disclosed in the patent referred to earlier in this application. Moreover, the mold of this invention does not include surfaces which are slid in frictional engagement with each other. This causes less wear of the mold surfaces than is encountered in molds of the type disclosed in the U.S. Pat. No. 3,456,913.

Other objects and advantages of this invention will become apparent upon reading the detailed description which follows, taken in conjunction with the drawings.

BRIEF DESCRIPTION OF THE DRAWINGS

FIG. 10 is an enlarged sectional view along 10—10 of FIGS. 8 and 9 with the mold sections in a closed condition for injection molding the container of FIG. 1;

FIG. 11 is an enlarged view of the region identified as "11" in FIG. 9 showing cavities and slots in the lower mold section which are employed to form the unique hinge in accordance with this invention;

FIG. 12 is an enlarged view of the region identified as "12" in FIG. 8 showing cavities and slots in the upper mold section which cooperate with the cavities and slots shown in FIG. 11 when the mold is in a closed condition to permit formation of the unique hinge of this invention;

FIG. 13 is a sectional view along 13—13 of FIG. 11 with the upper and lower mold sections in a closed condition;

DESCRIPTION OF THE PREFERRED EMBODIMENTS OF THE INVENTION

Figure 1:
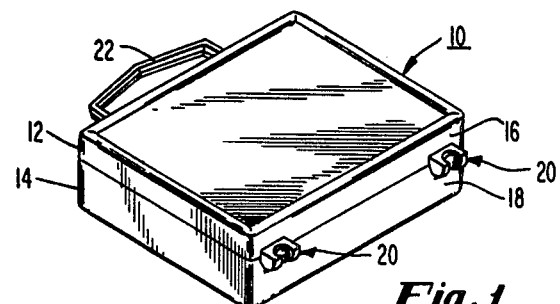
FIG. 1 is an isometric view of a container employing the unique hinge of this invention.
Figure 2:
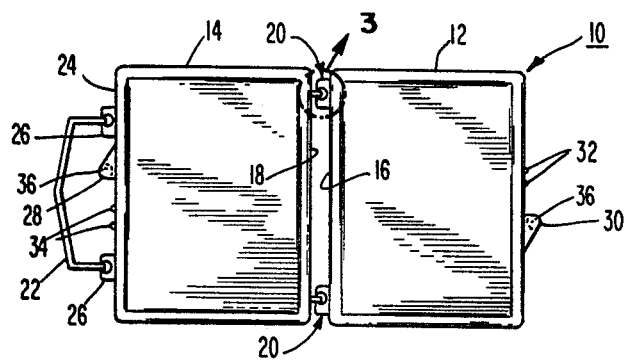
FIG. 2 is a plan view of the container shown in its opened condition as viewed from the back side of the container lid and container body.

Referring to FIGS. 1 and 2, a container 10 in accordance with this invention is preferably of a rigid plastic construction, and includes a container top 12 and a container bottom 14. Rear walls 16 and 18 of the container top and container bottom, respectively, are connected together through laterally spaced hinges 20. A handle 22 is connected to a front wall 24 of the container bottom 14 through laterally spaced hinges 26, which preferably are of an identical construction to the hinges 20.

The container 10 can be secured in its closed condition shown in FIG. 1 by the frictional engagement of projections 28 and 30 provided on the front walls of container bottom 14 and container top 12, respectively, with locking ribs 32 and 34 provided on the front walls of container top 12 and container bottom 14, respectively. More specifically, each of the projections 28 and 30 is provided with a downwardly directed extension 36 which is adapted to be disposed between, and in frictional engagement with respective locking ribs. This is a well-known locking arrangement which does not require further discussion.

Figure 3:
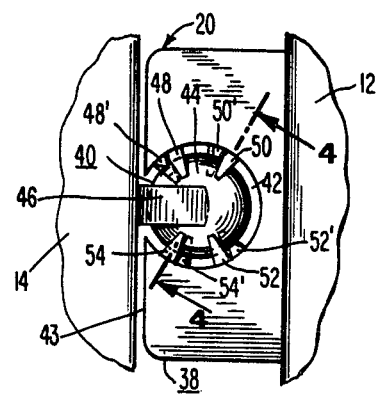
FIG. 3 is an enlarged view of the hinge identified as "3" in FIG. 2.

Referring to FIG. 3, the unique hinge 20 of this invention is of the ball and socket type, and includes a female hinge member 38 formed as an injection molded extension of the container top 12, and a male hinge member 40 formed as an injection molded extension of the container bottom 14. It should be understood that all of the hinges 20 and 26 are of an identical construction, and therefore, the description which follows will be limited to the construction of the hinge 20.

The female hinge member 38 is in the form of a socket, and includes a recess 42 extending inwardly from an outer wall 43 thereof. The male hinge member 40 has a substantially spherical member 44 disposed within the recess 42, and a support section 46 which is injection molded as a unit with the container bottom 14 and the spherical member 44. The spherical member 44 is molded within the recess 42 in a manner which will be described later.

Figure 4:
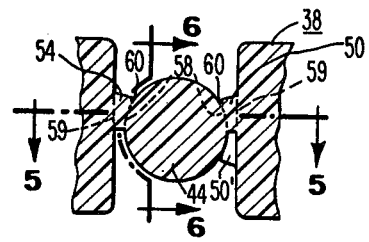
FIG. 4 is a sectional view taken along 4—4 of FIG. 3 showing the hinge in its as molded condition.
Figure 5:
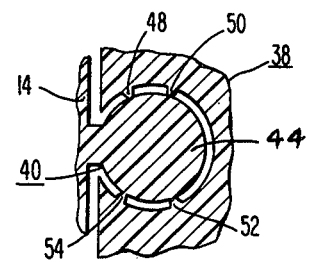
FIG. 5 is a local sectional view taken along 5—5 of FIG. 4.
Figure 6:
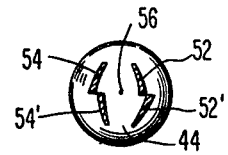
FIG. 6 is a sectional view taken along 6—6 of FIG. 4.

Referring the FIGS. 3-6, two sets of ribs extend radially into the recess 42 and are injection molded extensions of the spherical member 44 and the female hinge member 38. One set of ribs 48, 50, 52 and 54 is disposed above a horizontal plane which includes the hinge axis 56 (FIG. 6). The other set of ribs 48', 50', 52' and 54' is disposed below the horizontal plane which includes the hinge axis 56. It should be understood that the number of ribs within each set can be varied. In fact, for some applications it may be possible to include only a single rib above the horizontal plane including the hinge axis 56, and single rib disposed below said horizontal plane.

Referring to FIGS. 3 and 5, each of the ribs tapers in a direction toward the spherical member 44. Accordingly, the junction 58 (FIGS. 4) of each rib with the spherical 44 is narrower than the junction 59 of each rib with the curved wall defining the recess 42 in the female hinge member 38. As can be seen best in FIGS. 4 and 6, each rib also tapers in a direction away from the hinge axis 56, and the edge of each rib which is most remote from the hinge axis defines a V-notch 60 with the outer periphery of the spherical member 44.

The above-described configuration of the ribs provides an area of high stress concentration in the region of the V-notch 60 of each rib, and this region is the thinnest section of junction 58. Accordingly, when a rotational force is applied to the container top 12 and the container bottom 14 a high stress concentration will be imposed at the junction 58 between each rib and the spherical member 44 to cause the rib to fracture at, or closely adjacent its junction with said spherical member. In order to minimize the torque required to fracture the ribs each rib in the upper set of ribs is out of alignment with each rib in the lower set. This latter arrangement can be seen best in FIGS. 3 and 6. The fractured surfaces of the ribs provide inner races which confine the spherical hinge member 44 within the recess 42 of the female hinge member 38, while permitting rotational motion between said male and female hinge members.

When laterally aligned hinges connects article sections together the torque required to fracture the ribs adjacent each spherical hinge member 44 is further minimized by positioning all of the ribs out of alignment with a plane which bisects each spherical hinge member parallel to the rotational path of the linear axis of rotation provided by the hinges. Any ribs aligned with that bisecting plane would be extremely difficult to fracture since the torque applied to them would be at a minimum.

Figure 7:
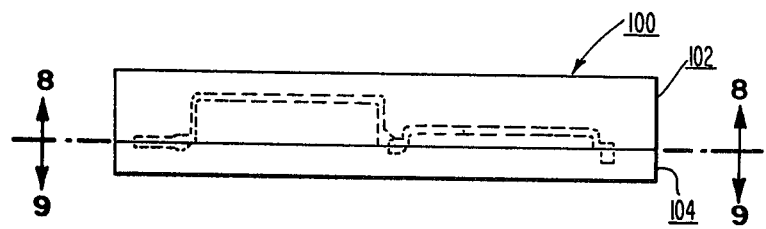
FIG. 7 is a side elevation view of the mold of this invention employed to form the container of FIG. 1.

Referring to FIG. 7, a unique mold 100 in accordance with this invention includes an upper mold section 102 and a lower mold section 104. For purposes of simplicity, the sprues, gates, runners and mold supports employed with the mold 100 have been omitted. It should be understood that these omitted elements are well known to people skilled in the injection molding art, and can be easily included in the mold 100 without the exercise of any inventive skill. In the description which follows the mold regions in which parts of the container 10 are formed will be designated by the same numerals as the container parts, but with a suffix "a" thereafter.

Figure 8:
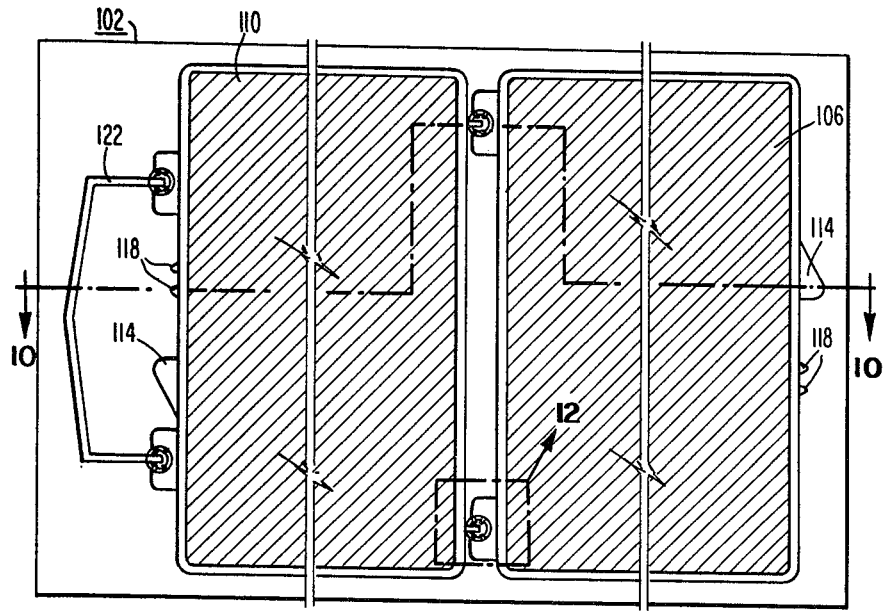
FIG. 8 is a view looking into the upper mold section in the direction indicated by 8—8 in FIG. 7.
Figure 9:
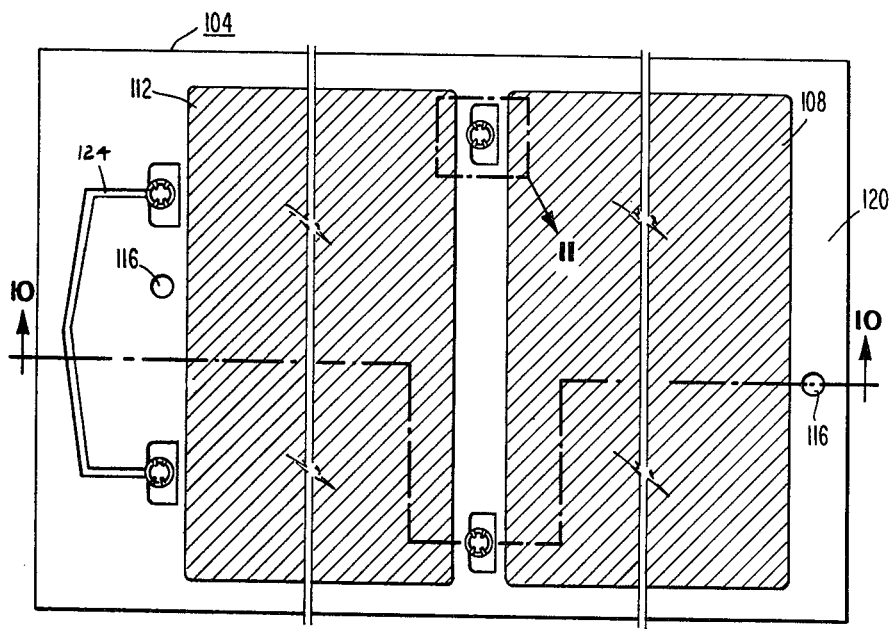
FIG. 9 is a view looking into the lower mold section in the direction indicated by 9—9 in FIG. 7.

Referring to FIGS. 8–10 the upper mold section 102 includes a cavity 106 which cooperates with a raised projection 108 on the lower mold section 104 to define a container top forming compartment 12a. A cavity 110 in the upper mold section 102 cooperates with a raised projection 112 on the lower mold section 104 to define a container bottom forming compartment 14a. Cavities 114 in the upper mold section 102 cooperate with cavities 116 in the lower mold section 104 to define projection forming compartments 30a (FIG. 10); the extensions 36 of the projections 30 being formed in the cavities 116. Cavities 118 in the upper mold section 102 cooperate with flat mating surface 120 of the lower section 104 to define locking rib forming compartments (only one of which is shown at 34a in FIG. 10) in which the locking ribs 32 and 34 are formed. A cavity 122 in the upper mold section cooperates with a cavity 124 in the lower mold section to define a handle forming compartment 22a.

The instant invention relates primarily to the arrangement of cavities and slots in the upper and lower mold sections 102 and 104, respectively, employed to mold the hinges 20 and 26 (FIG. 2) in such a way that when the container 10 leaves the mold 100 the spherical hinge member 44 is confined within the recess 42 of the female hinge member 38.

Referring to FIGS. 10 and 12, the upper mold section 102 includes a cavity 126 which is shallower than, and in communication with the cavity 106. The cavity 126 terminates short of the cavity 110, which defines one surface of the compartment 14a in which the container bottom 14 is formed. Accordingly, the cavity 126 does not directly communicate with the container bottom forming compartment 14a. The lower mold section 104 includes a cavity 128 which is aligned with the cavity 126 when the mold is in a closed condition to define a female hinge member forming compartment 38a.

Referring to FIGS. 10–14 substantially cylindrical mold segments, or inserts 130 and 132 are disposed within passageways 133 and 137 in the upper and lower mold sections 102 and 104, respectively. These mold inserts are rigidly secured to their respective mold sections, and interrupt the continuity of cavities 126 and 128. When the mold 100 is in a closed condition, as shown in FIG. 10, an outer periphery 134 of the mold insert 130 cooperates with an outer periphery 135 of the mold insert 132 to provide a generally continuous and curved surface around which a curved surface defining the recess 42 in the female hinge member 38 is formed. Mating ends of the inserts 130 and 132 have generally hemispherical cavities 136, 138, respectively, therein to define a spherical male hinge member forming compartment 44a.

Figure 14:
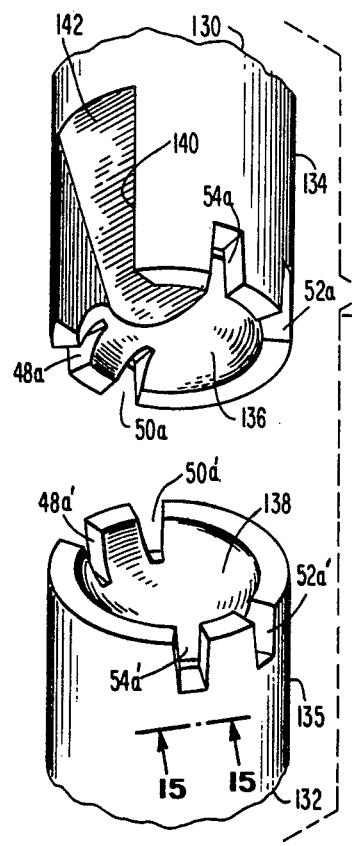
FIG. 14 is an enlarged isometric view of mold inserts employed in the upper and lower mold sections to form parts of the unique hinge of this invention.

Referring to FIGS. 10, 12 and 14, a slot 140 extends through the wall of the mold insert 130, and includes an inclined surface 142 which slightly interrupts the hemispherical configuration of the cavity 136. The slot 140 communicates with the container bottom forming compartment 14a, and, when the mold 100 is in a closed condition, the slot 140 cooperates with the flat mating surface 120 of the lower mold section 104 to define a support section forming compartment 46a in which the support section 46 of the male hinge member 40 is formed.

Referring the FIGS. 10, 13 and 14, axially extending slots 48a, 50a, 52a, and 54a extend inwardly from the mating end of insert 130, and are disposed through the outer wall thereof. These slots provide communication between the cavity 126 (one of the cavities providing the female hinge member forming compartment 38a) and the generally hemispherical cavity 136. Similar slots 48a', 50a', 52a' and 54a' are provided through the outer wall of the insert 132. These latter slots provide communication between the cavity 128 in the lower mold section 104 and the generally hemispherical cavity 138. When the mold sections 102 and 104 are in a closed condition, as shown in FIGS. 10 and 13, the axially extending slots 48a, 50a, 52a, and 54a in the upper mold insert 130 are circumferentially offset with respect to the axially extending slots 48a', 50a', 52a' and 54a' in the lower mold insert 132. From the above description it should be clear that the shape and dimensions of the ribs which confine the spherical male hinge member 44 within the recess 42 of the female hinge member 38 are defined by the shape and dimensions of the axially extending slots in the mold inserts 130 and 132.

Figures 15, 16:
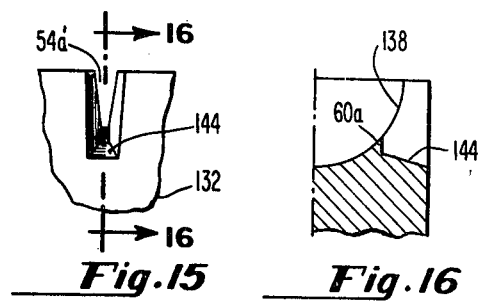
FIG. 15 is a side elevation view along 15—15 of FIG. 14.
FIG. 16 is a sectional view along 16—16 of FIG. 15.

Referring to FIGS. 14–16, the slots in which the ribs are formed taper in a radial direction from the outer peripheries 134 and 135 of the respective insert 130 and 132 to the inner surfaces defining the hemispherical cavities 136 and 138. This tapered configuration can be seen best in FIG. 15 which shows the recess 54a' in the lower mold insert 132. In addition, each of the axially extending recesses tapers in an axial direction from the upper mating surface of its respective mold insert to a base of the recess. This arrangement can be seen best in FIG. 15, wherein recess 54a' is shown as tapering in an axial direction to its base 144.

Referring the FIG. 16, the base 144 of recess 54a' terminates in a generally V-shaped projection 60a at its junction with the hemispherical cavity 138 to provide a mold surface for forming the V-shaped notch 60 at the edge of rib 54' which is most remote from the hinge axis 56 (FIG. 4). This same arrangement of V-shaped projections exists in all of the axially extending recesses in which the retaining ribs are formed.

Referring to FIGS. 10 and 13, it can be seen that the mold 100 is characterized by including a continuous passage connecting the container top forming compartment 12a with the container bottom forming compartment 14a. This continuous passage includes cavity 126 which communicates the compartment 12a with the cavity 128; axial slots 48a, 50a, 52a, 48a', 50a', 52a' and 54a' which provide communication between the male hinge member forming compartment 44a and the female hinge member forming compartment 38a; and support element forming compartment 46a wich communicates the spherical male hinge member forming compartment 44a with the container bottom forming compartment 14a.

In a preferred construction of the mold 100 a sprue is provided to feed separate runners which communicate with the container top forming compartment 12a and the container bottom forming compartment 14a. The material injection molded into these latter compartments will flow into the slots and compartments defining the construction of hinges 20.

It should be understood that the hinges 26 (FIG. 2) are formed by the cooperation of female hinge member forming compartments and mold inserts which are identical to those described in connection with the formation of the hinges 20. The mold inserts in the upper mold section 102 which is employed in the formation of each hinge 26 includes a slot similar to slot 140 of the mold insert 130, and the slot directly communicates the spherical male hinge member forming compartment with the handle forming compartment 22a. When the handle to be formed is of small proportions it is generally not necessary to include a separate runner communicating the sprue with the handle forming compartment 22a. The material which is injection molded into the container bottom forming compartment 14a will flow through the female hinge member forming compartment, the spherical male hinge member forming compartment and the handle forming compartment 22a to form the handle.

The number of hinges provided to connect any two sections of an article together can be varied. For some applications it may be desirable to include only one hinge, and in that case, the sections connected by the hinge can be universally rotated with respect to each other. Moreover, in articles wherein additional rigidity of the hinge is desired, or required, more than two hinges can be provided in lateral alignment with each other. The ability to form more than two hinges in lateral alignments with each other in accordance with this invention exists because sections of the mold are separated by moving them in a linear direction with respect to each other. Stating this another way, the use of core pins which are required to be retracted transversely of the linear direction of movement of upper and lower mold sections are not employed in the preferred mold construction of this invention. When transversely movable core pins are employed in a mold to form hinges it is generally only possible to form two hinges in lateral alignment with each other.

The plastic materials employed in this invention preferably are thermoplastic synthetic resins such as polystyrene and vinyl resins. Most preferably the synthetic resins which are employed are of the type which are rigid after being set.

term "rigid," as used throughout this application to describe the construction of the articles, refers to a condition wherein a molded section of the article cannot be flexed relative to itself to any significant degree without being fractured. When the female hinge member is of such a rigid construction it cannot be flexed to enlarge the dimensions of its recess for permitting the spherical male hinge member to be positioned and retained within said recess subsequent to the formation of the male and female hinge members.

Although specific details of construction had been disclosed in this application it should be understood that the claims which follow set forth what applicant regards as his invention.

I claim:

1. An article including two sections articulated to one another by at least one hinge that includes a substantially spherical male hinge member disposed within a recess of a female hinge member and retaining means for confining the male hinge member within the recess of the female hinge member, the improvement wherein said retaining means of said at least one hinge member forms molded junctions with adjacent surfaces of the male hinge member and the recess of the female hinge member, said retaining means being fracturable at or adjacent the molded junction of the male hinge members to confine the male hinge member for rotational motion within said recess.

2. The article of claim 1 including at least two of said hinges connecting two sections together, said hinges being laterally spaced to provide a linear axis of rotation between said two sections.

3. The article of claim 2 wherein the retaining means of each hinge includes ribs forming the molded junctions with the adjacent surfaces of the sperical male hinge member and the recess of the female hinge member.

4. The article of claim 3 wherein the ribs of each hinge include fractured surfaces adjacent to and generally conforming in shape with the outer periphery of the spherical male hinge member.

5. The article of claim 3 including at least two of said ribs in each hinge, at least one rib in each hinge being disposed on one side of a lateral plane which bisects the substantially spherical male hinge member and includes the linear axis of rotation therein, and at least one rib in each hinge disposed on the opposite side of said lateral plane.

6. The article of claim 5 including two sets of ribs in each hinge, one set of ribs being disposed on one side of said lateral plane and the other set of ribs being disposed on the opposite side of said lateral plane.

7. The article of claim 6 wherein the ribs in one set are offset with respect to the ribs in the other set.

8. The article of claim 7 wherein each set of ribs includes at least two ribs.

9. The article of claim 7 wherein each set of ribs includes four ribs.

10. The article of claim 6 wherein the ribs are disposed outside of a plane which bisects the substantially spherical male hinge member parallel to the rotational path of the hinge axis.

11. The article according to claim 10 wherein one of the article sections is a bottom of a container and includes a three dimensional compartment for retaining articles therein, and the other section of the article is a container top which is articulated to said container bottom through at least two of said hinges which are laterally spaced from each other and connect confronting rear surfaces of said container top and container bottom together.

12. The article of claim 11 including a nonlinear section having laterally spaced ends articulated to a front wall of either said container top or container bottom to form a handle on the container, said laterally spaced ends of the handle being articulated to said front wall through two hinges, each of said two hinges including a substantially spherical male hinge member constituting each respective end of the handle, a female hinge member consitituting a molded extension of said front wall and including a surface providing a recess in which the substantially spherical male hinge member is disposed, and retaining means for confining the male hinge member within the recess while permitting rotational motion of the male hinge member within the recess.

13. The article of claim 12 wherein the retaining means of the hinges through which the handle is articulated includes ribs forming injection molded junctions with the outer periphery of the substantially spherical hinge member and the surface providing the recess of the female hinge member, said ribs being fracturable at or adjacent the junctions with the spherical hinge member by rotating the handle relative to the front wall about a lateral axis bisecting the laterally spaced substantially spherical members of the hinges.

14. The article of claim 3 wherein the ribs taper in a direction toward the spherical male hinge member whereby the molded junction of each rib with the outer periphery of the male hinge member is narrower than the molded junction of each rib with the surface providing the recess of the female hinge member.

15. The article of claim 14 wherein each rib tapers in a direction toward its end which is most remote from the linear axis of rotation.

16. The article of claim 15 wherein said most remote end of each rib defines a substantially V-shaped notch with the outer pheriphery of the male hinge member.

17. The article of claim 1 wherein the retaining means includes fractured surfaces adjacent to and generally conforming in shape with the surface of the spherical male hinge member.

18. The article of claim 1 wherein the retaining means include ribs that taper in a direction toward the spherical male hinge member whereby the molded junction at the male hinge member is narrower than the molded junction at the recess of the female hinge member.

* * * * *